April 2, 1935. W. L. McEVER 1,996,585
INCINERATOR
Filed Aug. 27, 1932 6 Sheets-Sheet 1

Fig. 1.

INVENTOR
W. L. McEVER
BY Louis L. Ansart
his ATTORNEY

April 2, 1935.    W. L. McEVER    1,996,585
INCINERATOR
Filed Aug. 27, 1932    6 Sheets-Sheet 3

Fig. 3.

INVENTOR
W. L. McEVER
BY Louis L. Ansert
his ATTORNEY

April 2, 1935.  W. L. McEVER  1,996,585
INCINERATOR
Filed Aug. 27, 1932   6 Sheets-Sheet 6

Fig. 6.

INVENTOR
W. L. McEVER
BY
ATTORNEY

Patented Apr. 2, 1935

1,996,585

UNITED STATES PATENT OFFICE 1,996,585

INCINERATOR

William Linton McEver, Yonkers, N. Y., assignor to Decarie Incinerator Corporation, a corporation of New York Application August 27, 1932, Serial No. 630,689

10 Claims. (Cl. 110—17)

My invention relates to incineration and more particularly to apparatus and methods for the burning of material such as garbage and rubbish or a mixture of both.

An important object of the invention is to provide a new and advantageous method for burning material of the general class specified. Another important object of the invention is to provide new and advantageous apparatus for the general purpose specified. An important feature of the invention relates to the utilization of air for grate-cooling purposes and to the utilization of the preheated air thus obtained to aid combustion. Another feature relates to the provision of novel apparatus in which there is a drying zone for the material to be burned, thus avoiding the provision of a drying hearth. It is also an object of the invention to provide novel apparatus in which there is a definite zone for the distillation of the volatile matter in the fuel. Another feature of the invention relates to the provision of a definite zone for the distillation of the volatile matter in the fuel, so located as to assure a thorough mixing of volatile combustible matter with preheated air in a high temperature region, thereby producing conditions that are prerequisite for the complete combustion of the volatile combustibles, or the combustion thereof without producing smoke. Another feature resides in the provision of a definite zone for the combustion of the volatile matter, that is the combustion chamber.

It is also an object of the invention to provide apparatus whereby, in drying material and distilling or driving off the volatile combustible and moisture, provision is made for a thorough circulation and flow of gases along the bottom, top and both sides of the material, thereby eliminating short-circuiting of the gases and assuring the exposure of maximum area of the material to be dried. Another feature of the invention relates to advantageous means whereby a substantially uniform velocity of gases leaving the furnace chamber will be obtained. A further feature relates to the provision of means whereby the drying action of the hot gases upon the material will be substantially completely utilized. It is also a feature of the invention to provide for effecting the separation of solid matter entrained in the gases whereby the solid matter may be retained instead of being carried out through the stack. It is also an object of the invention to provide for control of the admission of air to the grate sections whereby a positive control may be obtained for maintaining an oxidizing atmosphere, or one containing sufficient oxygen, throughout the furnace chamber.

According to a preferred form of carrying out the invention, provision is made of a furnace chamber with refractory lined walls and containing a series of grates, an upper or basket grate for receiving material and holding it in suspension in the path of the hot gases, thereby distilling or driving off by the application of heat the volatile combustible and moisture contained in the material, and a second or lower grate located beneath the first mentioned grate and upon which unburned dried material from the upper grate is burned.

At the outlet of the furnace is a bridge wall, so arranged as to make the gases leaving the furnace chamber move upward and around and through the material held in the basket grate. The basket grate consists of a series of tubes preferably U-shaped, one end of each tube terminating in a common header or manifold to which air is supplied by suitable means such as a fan and the other end of each tube terminating in a common header or manifold which in turn conveys the air to one or more airports located below the grates. Preferably the headers or manifolds are located above the roof of the furnace chamber and are made of varying cross sectional areas to provide for proper distribution of air. The vertical legs of the tubes are spaced from the refractory walls of the furnace chamber in order to form a passageway for the gaseous products of combustion.

The horizontal portion of the tubes are located sufficiently above the lower grate to enable the unburned dried material from the basket grate to be burned on the lower grate. Inasmuch as both the combustion cycle and temperature of the products of combustion increase as they progress toward the exit from the furnace chamber, the horizontal portions of the tubes are arranged at different heights so as to lie in an inclined plane rising toward the outlet end of the furnace chamber.

In this way a more uniform velocity of gases can be obtained, a condition which is conducive to complete combustion.

The dried material from the basket grate may be stoked to the lower grate where due to the previous drying in the basket grate it may be consumed very rapidly. Inasmuch as gases rising from the combustion of material on the lower grate will be at a high temperature and in order to leave the furnace chamber must pass around, under and over the basket grate, material in the basket grate will be dried very rapidly. The non-combustible material passes to one or more ash pits located below the lower grate and from such ash pits the non-combustible material is removed to the place of final disposal.

The admission of air below the lower grate or grates and under suitable control assures a sufficient supply of oxygen so that an oxidizing atmosphere rather than a reducing atmosphere, or one deficient in oxygen, can be maintained throughout the furnace chamber. Preferably the space below the lower grate is sub-divided as by division walls and air is admitted separately to the separate parts thus set off.

From the furnace chamber the gases and suspended solids pass over the bridge wall and enter a combustion chamber having beneath the level of the top of the bridge wall and preferably at the opposite side an opening for the exit of gases to a flue leading to a stack.

The volatile or gaseous combustible in the material is distilled off at relatively low temperature and moves out with the gaseous products of combustion. Inasmuch as they travel at relatively high velocity in the furnace chamber it is necessary to provide room for the expansion of the gases resulting from combustion of the volatile, this being one of the functions of the combustion chamber. The rapid movement of gases in the furnace chamber results in the carrying over by the gases of a large amount of solid material such as ash. However, as by causing the gases to enter the combustion chamber at the top and front and to leave near the bottom at the back and by causing a sudden change in the direction of flow to pass the gas out of the combustion chamber, the solids are thrown down into a quiescent zone called a settling chamber which constitutes a downward continuation of the combustion chamber and provides a space ample for the storage of solids for a normal operating period. These features may be applied to furnace chambers of substantially all types.

Other features and advantages appear upon consideration of the following detailed description and of the drawings, in which.

Figure 1:
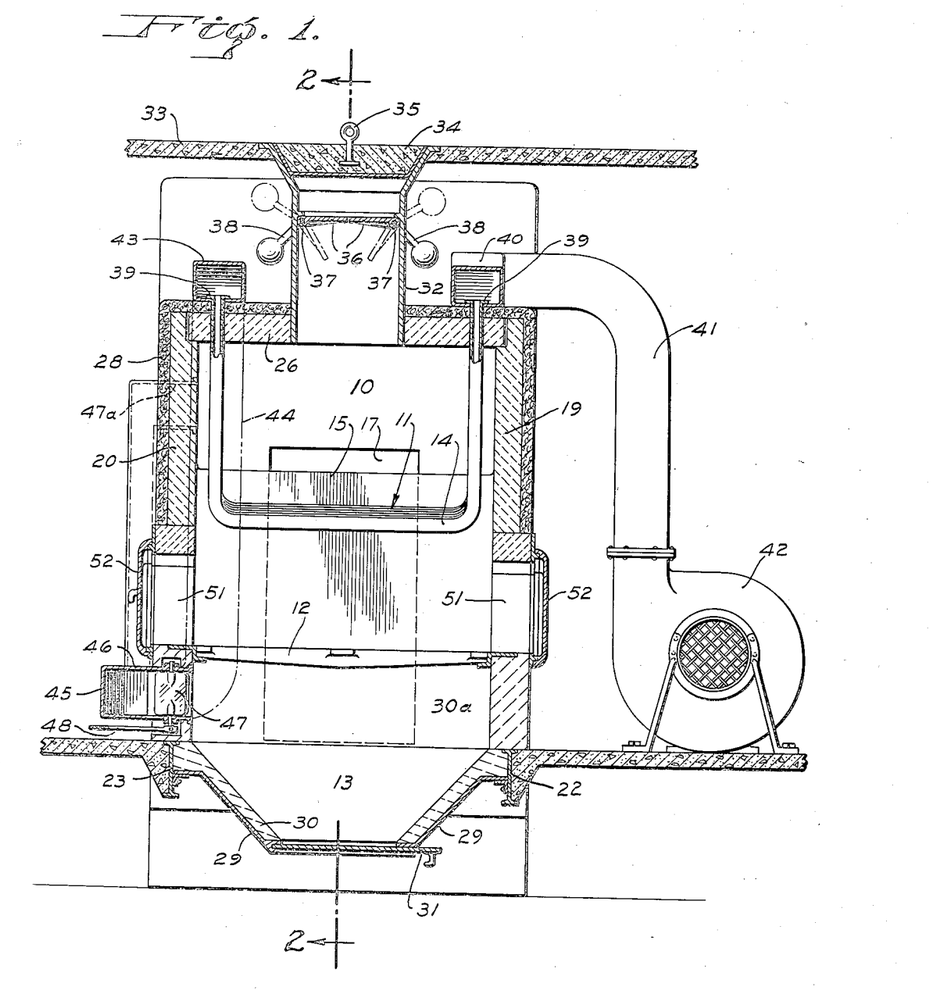
Fig. 1 is a vertical section of a preferred embodiment of the invention, taken along line 1—1 of Fig. 2.
Figure 2:
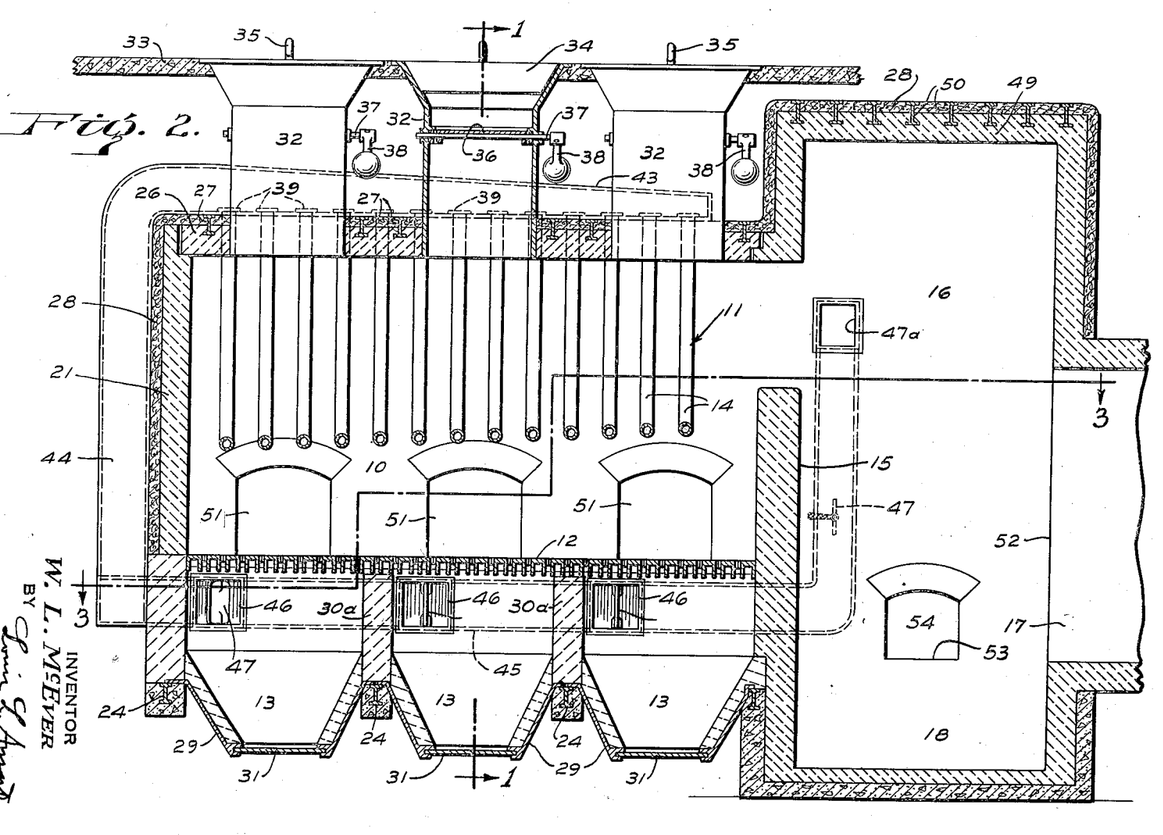
Fig. 2 is a section taken along line 2—2 of Fig. 1.
Figure 3:
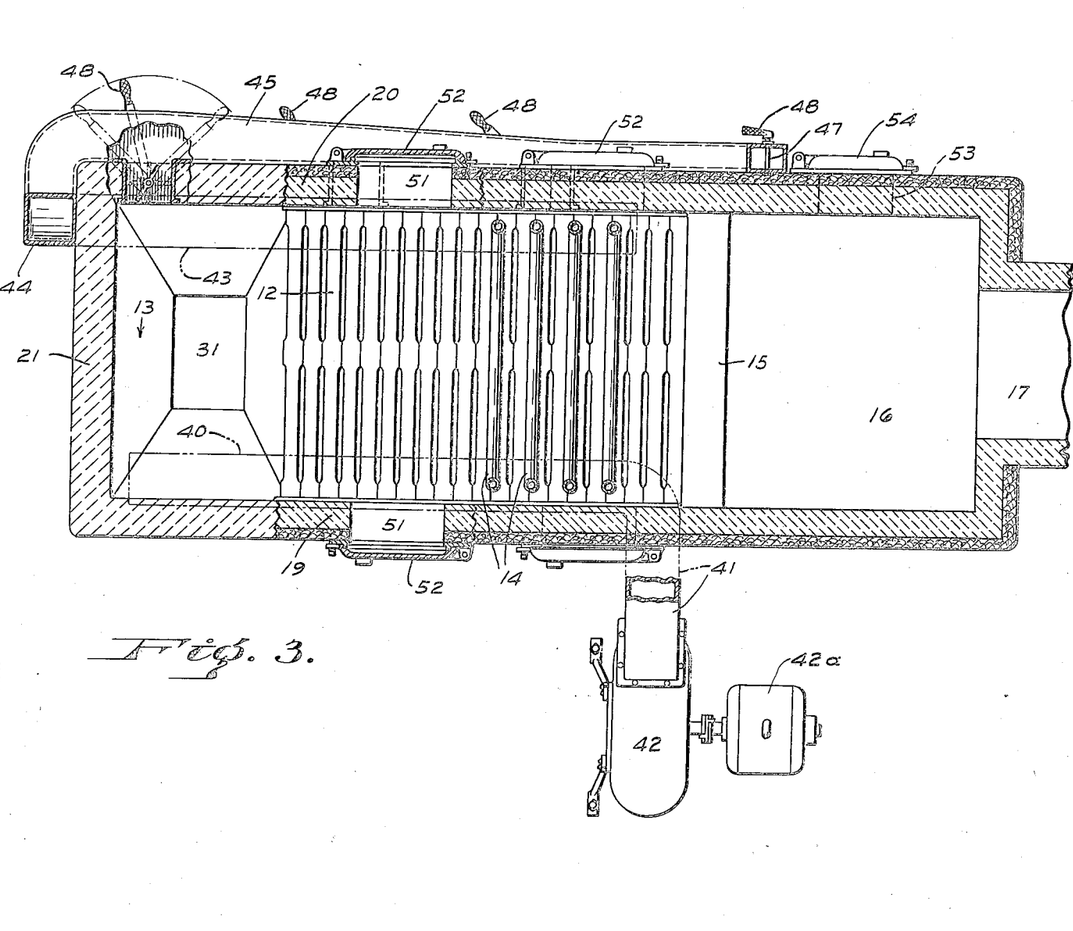
Fig. 3 is a section taken along the line 3—3 of Fig. 2.

In Figs. 1, 2 and 3, there is illustrated a preferred embodiment of the invention in which material dumped into a furnace chamber 10 is dried on an air cooled basket grate 11 and finally is burned on lower grates 12 above ash pits 13, the combustion being aided by the introduction beneath the grates 12 of air preheated by passing it through the tubes 14 of the basket grate. From the furnace chamber the gases and suspended solids pass upwardly over a bridge wall 15 into a combustion chamber 16, where they are turned downwardly to pass out of the flue 17 connected, for example, with a stack (not shown). By thus causing the gases to flow downwardly and then outwardly into the flue 17, the solids are thrown out of the current into a quiescent zone constituting a settling chamber 18 which is a downward continuation of the combustion chamber 16 below the adjacent end of the flue 17.

The furnace chamber 10 has side walls 19 and 20 and at its end, opposite to the bridge wall 15, a closed end 21. The side walls 19 and 20 are supported by means including I beams 22 and 23, respectively, which also support I beams 24. The end wall 21 may be supported on a correspondingly positioned I beam 24. The upper part of the furnace chamber 10 may be closed in any suitable manner, but, as illustrated, it is closed by a flat arch top 26 suspended by I beams 27 spanning the distance between the side walls 19 and 20. The interior surfaces in the furnace chamber and combustion chamber are subjected to very high temperatures and are therefore formed of refractory material. Preferably also the walls are covered with insulating material 28 which may if desired be enclosed in a metal covering.

As illustrated in the drawings the main portions of the walls of the furnace chamber and the combustion chamber are of refractory materials. Below the lower grate 12 the requirement for resistance to heat is very much lower than at the sides and tops of said chambers and the various walls below the level of the grate 12 may be of any suitable material, such as ordinary brick. Below the ash pits the requirements for heat resistance are still less and may be met by use of any suitable material, such as concrete.

As illustrated the ash pits 13 include in each case a metal casing 29 in hopper form with flanges at its upper edges adapted to overlie flanges of the I beams 22 and 23 (Fig. 1) and flanges of I beams 24 (Fig. 2), and a lining 30 of suitable material such as brick. Each casing 29 is closed at its bottom in any suitable manner, as by means of a door 31 sliding in grooves in the lower end of the casing. As shown in Fig. 2, provision is made of transverse walls 30a extending upwardly from the intermediate I beams 24 to the grates 12 to enable better control of the fire on different parts of grates 12, as will be brought out more fully hereinafter.

The material to be incinerated may be supplied to or charged into the furnace chamber in any suitable manner, as by means of one or more charging chutes 32 with their flared upper ends in a charging floor 33 and their lower ends extending downwardly to the top 26 of the furnace chamber. The flared upper ends of the chutes 32 are normally closed by covers 34 which are provided with suitable means such as eye members 35 by which they may be shifted from one position to another. To keep the charging chutes closed except when material is passing downwardly therethrough, each charging chute 32 is provided with two swinging doors 36 mounted on shafts 37 pivotally supported in the walls of the chute and extending to the outside thereof where they are provided with weighted arms 38 which normally hold the doors in closed position as shown in full lines on Fig. 1. It will be evident that when material is dropped on doors 36 they will be shifted from their full line positions in Fig. 1 to their dot and dash positions and allow the material to fall upon the basket grate 11.

Preferably the tubes 14 of which the basket grate 11 is composed are U shaped and the legs thereof pass upwardly through the top 26 of the furnace chamber where they may be secured by means of outwardly projecting flanges 39.

The vertical legs of the tubes are placed at a distance from the walls of the furnace chamber in order to form passageways for the gaseous products of combustion, and the horizontal portions of the tubes are located sufficiently above the lower grate 12 to allow for unburned dried material from the basket grate to be burned on the lower grate.

The upper grate 11 is high enough above the lower grate 12 to avoid interference with the burning of material on the lower grate. Also in order to provide for a more uniform velocity of flow of the gases on their way out of the furnace chamber by allowing for increase in volume due to the advance in the combustion cycle and the increase in temperature of products of combustion as they progress toward the exit of the chamber, that is the opening over the top of the bridge wall 15, the horizontal portions of the tubes 14 may be made to lie in a plane inclined to the plane of the lower grate so as to diverge therefrom toward the exit from the furnace chamber. The greater uniformity of velocity of flow thus obtained is conducive to complete combustion.

It will be evident that the material held in the basket grate is exposed to the hot gases at both sides and at the top and the bottom, thus rendering the drying action very effective due to the large area of material in contact with the hot gases.

At one side of the furnace and adjacent to the top of the wall 19 the tube ends communicate with a common header or manifold 40 which is connected near the combustion chamber with a conduit 41 connected with a fan 42 adapted to force air into the header and through the tubes 14 of the basket grate. The fan may be driven in any suitable manner, for example by an electric motor 42a. As shown in Fig. 1 the header 40 varies in cross section to provide for proper distribution of air to the tubes.

At their other ends the tubes 14 communicate with a common header or manifold 43 which extends along the top 26 of the furnace chamber and increases in cross section area from its end adjacent to the combustion chamber toward the closed end 21 of the furnace chamber, in order to provide for the increase in volume of the air as it flows toward the end 21 of the furnace chamber. The larger end of the manifold 43 is connected with a duct 44 which passes downwardly to a point below the level of the grates 12 where it connects with a horizontal duct or section 45 extending along the side 20 of the furnace chamber.

The horizontal duct 45 communicates through short ducts 46 with chambers below the grates 12 and separated from each other by the transverse walls 36a. It will be seen that these chambers communicate with and may be said to be parts of the ash pits 13. Preferably the ducts 46 are located at the rear sides of the chambers or ash pits so that air may be supplied to the areas of the grates 12 above the ash pits. Provision for control of the amount of air entering through the ducts 46 may be made by providing each one of the short ducts 46 with a butterfly valve, or damper, 47 pivoted at its top and bottom in the walls of the duct, and by providing one of the pivots of each damper, preferably the lower one, with a handle 48 extending outwardly beneath the duct 45 so as to be accessible for operation.

The horizontal duct 45 in addition to furnishing air through the short ducts 46 supplying air below the grates 12 may supply air to the combustion chamber and for that purpose may be continued to a suitable point at the side of the combustion chamber 16 and there connected with the interior of the chamber by a short horizontal duct 47a which may be provided with a damper 47 similar to those used in the ducts 46.

Preferably the top 49 of the combustion chamber 16 rises above the top 26 of the furnace chamber 10, thus allowing the gases and suspended matter passing upwardly over the bridge wall to go higher before being turned downwardly. The top 49 may be of any suitable form but is illustrated as a flat arch suspended from I beams 50.

In the sides of the furnace chamber and at or about the level of the bottom of the basket grate 11 and the lower grate 12, may be provided openings or stokeholes 51 closed by doors 52. Obviously the openings 51 may be used for observation as well as for working or stoking. Provision may also be made of an opening 53 through the wall of the combination chamber 16 for cleaning and for observation, and of a door 54 to close the opening.

In operation, a cover 34 is removed whenever it is desired to admit material to the furnace chamber 10 through the corresponding hopper 32. When the material is dumped into the hopper, it falls on the gates 36 and they are swung from the full line positions to positions represented in dot and dash lines in Fig. 2, thus permitting the material to fall into the basket grate 11. The basket grate may be cooled by air forced through the individual tubes from the header 40 to the header 43. While the air tends to cool the various tubes of the basket grate, it is, at the same time, preheated so that, when supplied to the lower part of the furnace chamber, and to the combustion chamber, it will aid combustion. Although the tubes of the basket grate 11 are cooled to a certain degree by the air forced therethrough, the tubes will be subjected to high temperatures. Suitable resistance to the action of such high temperatures may be produced by using suitable heat resisting alloys.

Careful regulation of the temperature of the tubes of the basket grate is necessary. The volume of air which must be forced through the tubes to produce the desired cooling effect is, in general, in excess of that required, or found desirable, for producing proper conditions in the furnace chamber. The excess of preheated air may, however, be utilized to advantage in supplying oxygen for the combustion of the gases in the combustion chamber 16.

After the heating received in the tubes of the basket grate, the preheated air forced from the tubes 14 by the fan 42 passes through the manifold 43 and duct 44 to the various inlets 46 beneath the grates 12. The supply of air into the ash pits 13 may be so distributed as to assure full oxidation or combustion throughout the furnace chamber. The horizontal portions of the tubes 14 are located sufficiently above the lower grate not to interfere with the burning of the unburned dried material passing from the basket grate 11 to the grate 12. As already stated, the horizontal portions of the tubes lie in an inclined plane rising toward the bridge wall 46. This arrangement tends to provide for more uniform velocity of the gases which is conducive to complete combustion.

The material held in the basket grate is exposed to the hot gases at its top and at its bottom, and at its sides due to the spacing of the vertical arms of the U-shaped tubes 14 away from the walls of the furnace chamber. The bridge wall 15 also turns the burned gases upwardly and assures drying of the material in the basket grate. Such dried material in the basket grate may be stoked to the lower grate 12 through the stoke-holes or openings 51 normally closed by the hinged doors 52. The material passing to the lower grate has been dried while retained in the basket grate and will be consumed rapidly. The non-combustible matter passes from the grates 12 to the ash pit or pits 13 and may be removed to the place of final disposal. In this connection it may be said that the grates 12 may be of any suitable kind, for example, stationary, shaking or dumping, or a combination of types. By controlling the butterfly valve or dampers 46 the air may be admitted below the lower grates in such proportions that an oxidizing atmosphere can be maintained throughout the furnace chamber.

Figure 4:
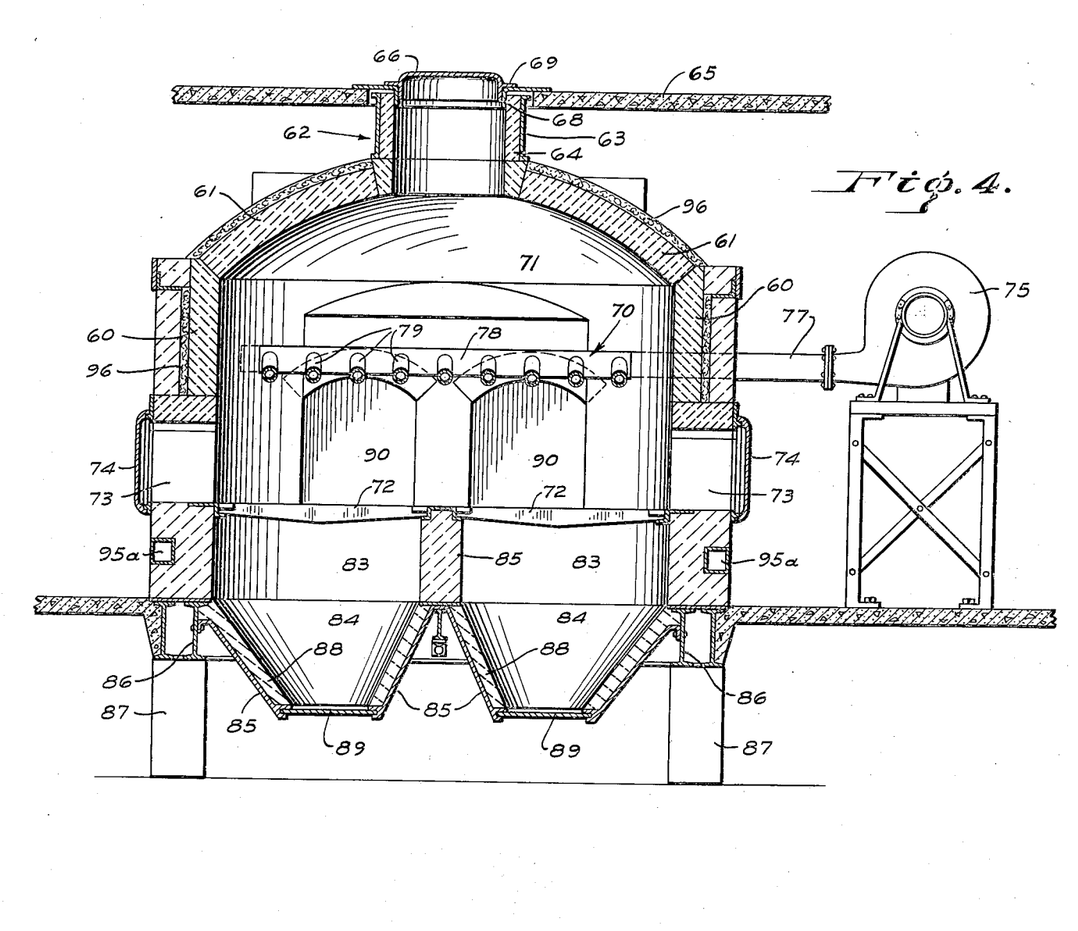
Fig. 4 is a view, similar to Fig. 1, of a modified form of the invention taken along line 4—4 of Fig. 5.
Figure 5:
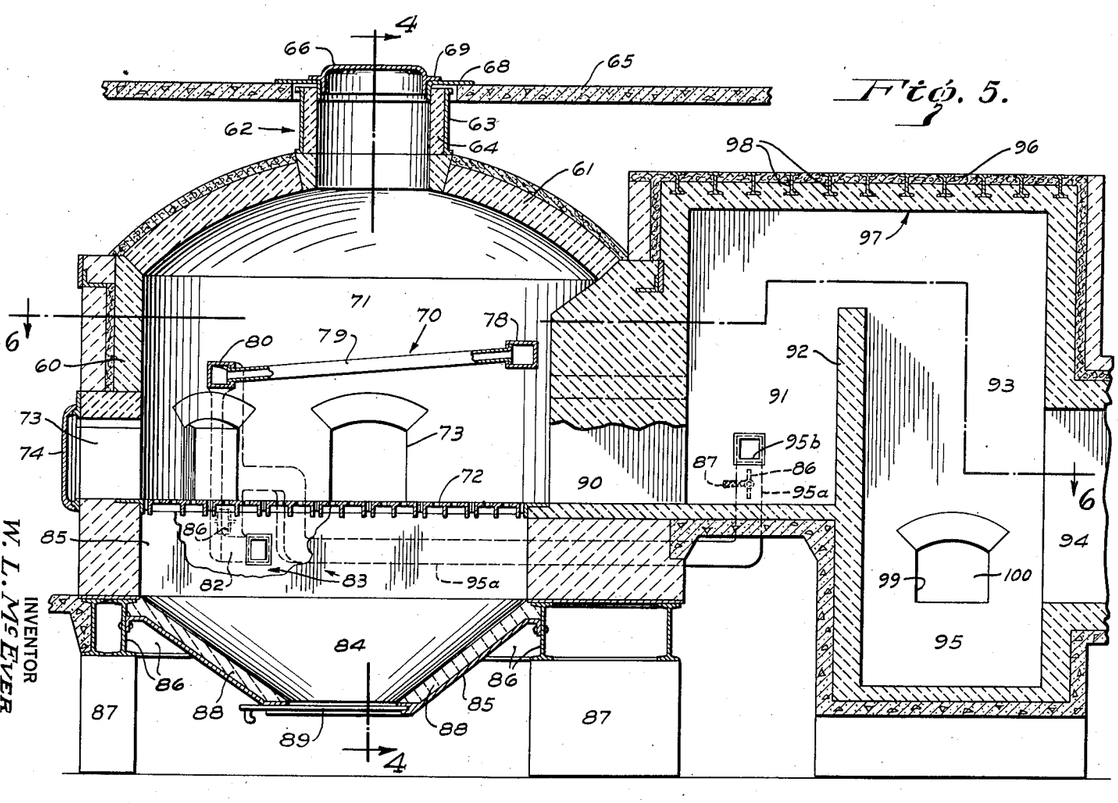
Fig. 5 is a longitudinal section.
Figure 6:
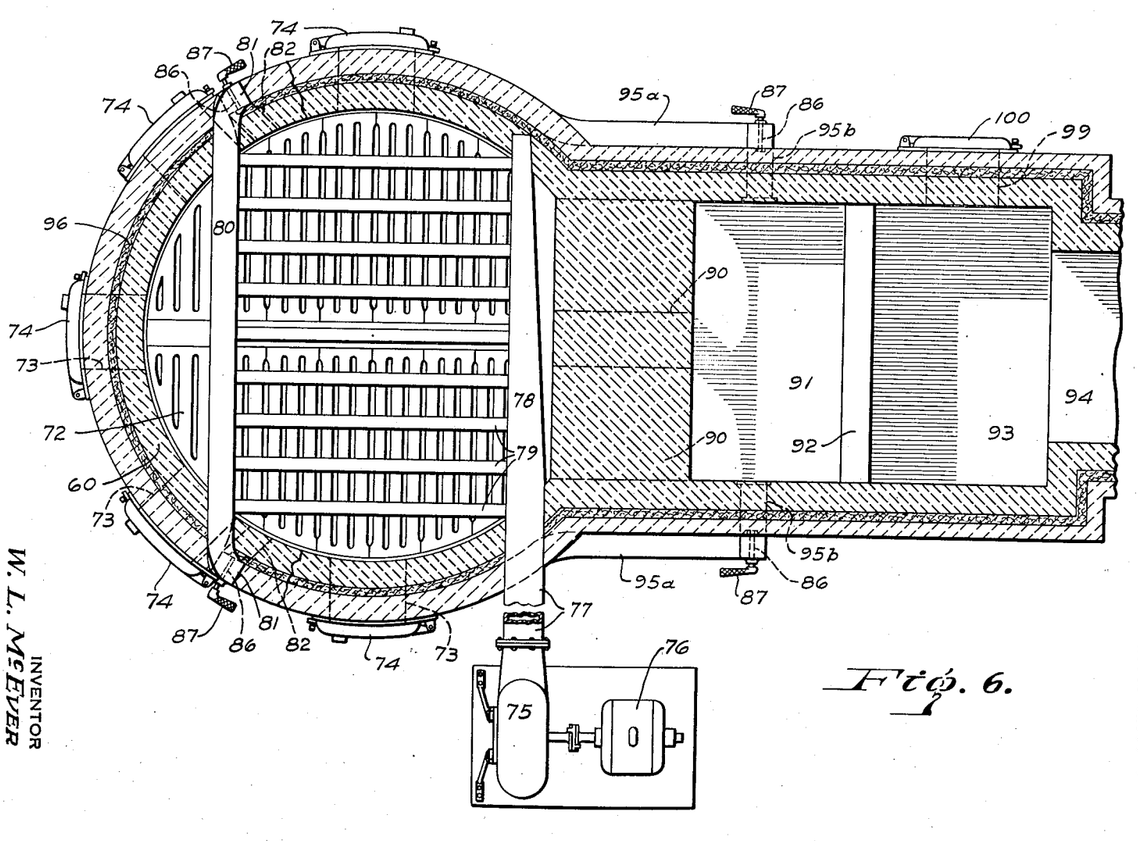
Fig. 6 is a section taken along the line 6—6 of Fig. 5.

In Figs. 4, 5 and 6, there is illustrated an application of the invention to an incinerator including a furnace chamber of the circular type which is provided with a circular wall 60 and a dome-shaped top 61 provided with a charging chute 62 having a metal outer casing 63 with a lining 64 of refractory material. As shown the charging chute 62 projects upwardly through a corresponding opening in a floor 65 and is normally closed by suitable means such as a cover 66 having an annular downwardly extending flange engaging a corresponding flange at the inner edge of an annular member 68 supported by floor 65. The cover 66 also has an outward projection 69 which rests on the horizontal portion of the member 68.

When material is dumped through the chute 62, it falls upon an air cooled drying grate 70 which is inclined upwardly toward the discharge side of the furnace chamber 71 and is spaced from the inner surface of the circular wall 60 so that the hot gases can pass upwardly at the edges of the grate. After being dried on the grate 70, the material either falls therefrom upon a lower grate 72 or is stoked down by suitable implements introduced through one or more stokeholes 73 which are normally closed by doors 74. The material reaching the grate 72 is ready to be burned on that grate. The upper grate 70 is high enough above the lower grate 72 to avoid interference with the burning of material on the lower grate and the inclination of the upper grate 70 is such as to provide for a more uniform velocity of flow of the gases on their way out of the furnace chamber by allowing for increase in volume due to the advance in the combustion cycle and the increase in temperature of the products of combustion as they progress toward the exit of the chamber.

The cooling of the upper grate 70 by air serves to heat the air by which the heating is effected and this preheated air is used to improve the conditions for burning material on the lower grate. To this end, air is forced, by means such as a rotary fan 75 driven by a motor 76 through a duct 77 into a header 78 connected with tubes 79 forming part of the drying grate 70. Preferably the header 78 in this circular type of furnace is located in the furnace chamber. At their other ends, the tubes 79 supply heated air to a header 80 parallel to the header 78 extending across the chamber and having at its ends connections with vertical branches 81 extending downwardly in the wall 60 to points beneath the grate 72 and connected with short horizontal branches 82 extending to the interior of the furnace chamber where they are connected with the rear ends of ash pit chambers 83 above ashpits 84 and separated by a wall 85 of suitable material. Preferably, also, the header 80 is located in the furnace chamber. As described in connection with the other type of apparatus, there is an excess of preheated air over that required in the furnace chamber. This excess may be utilized as described hereinafter. Control of the air introduced by the branches 82 may be effected by means of butterfly valves or dampers 86 adjusted from the outside by means of handles 87. In this arrangement the chambers 83 are arranged side by side instead of being arranged one behind another as in the first form described.

Preferably the ash pits 84 are formed of outer casings or hoppers 85 attached to I beams 86 resting on a foundation 87 and forming part of the support for the walls of the furnace chamber, and heat resisting linings 88 for the casings 85. At their lower ends the ash pits are normally closed by doors 89, which may be in the form of slides supported in grooves in the metal of the casings 85.

From the furnace chamber the gases of combustion may pass through two outlets or flues 90 into a chamber 91 terminating in a bridge wall 92 which causes the gases to flow upwardly into a combustion chamber proper 93 where the gases are turned downwardly and then out to one side through a flue 94 connected, for example, to a stack for draft purposes. There is an extension of the combustion chamber 93 below the flue 94, which extension serves as a settling chamber 95 into which the solids in the downward stream of gas are thrown when the gases are turned outwardly through the flue 94.

A suitable supply of oxygen is also necessary to produce proper combustion in the combustion chamber. The excess of preheated air in the ducts 81 may be supplied through ducts 95a and short ducts 95b to the interior of chamber 91 which may be considered to be a part of the combustion chamber. Flow of preheated air into chamber 91 may be controlled by additional dampers 86.

It should be understood that all walls subjected to high temperatures should be made of refractory material, and, as illustrated, the walls and top of the furnace chamber and the linings of the combustion chamber are made of refractory material which is preferably covered by insulating material 96 which, if desired, may be covered with metal plates or sheets (not shown). Below the level of the grate 72 the temperature is not so high and use may be made of heat-resisting material such as brick. Other parts which are not subjected to heat may be made of any suitable material such as concrete.

As illustrated in the drawings the chamber 91 and the combustion chamber 93 have a common top 97, which may be of any suitable construction but is here shown as a flat arch suspended from I beams 98 resting on the side walls. The combustion chamber 93 may be provided at one side with an opening 99 for observation and cleaning purposes, which opening is normally closed by a door 100.

It will be evident that the operation in connection with the second form of apparatus is in general similar to that described for the first form. There are however certain differences arising necessarily in view of the differences in construction and arrangement of parts.

It should be understood that various changes may be made and that certain features may be used without others, without departing from the true spirit and scope of the invention.

Having thus described my invention, I claim

1. In an incinerator, a furnace chamber adapted to be charged from the top and having at a side thereof an outlet for combustion gases, a combustion grate at the lower part of said chamber, a hollow drying grate above the first mentioned grate and inclined thereto so as to diverge therefrom towards the outlet side of the chamber, and means for supplying air to said drying grate adjacent to the side containing said outlet and withdrawing heated air from the drying grate at its opposite side and delivering the heated air beneath said combustion grate.

2. In an incinerator, a furnace chamber having a lateral enclosing wall, a combustion chamber, means including an outlet in said wall for directing gases from the furnace chamber upwardly into the upper part of the combustion chamber, a combustion grate at the lower part of the furnace chamber, an air cooled drying grate above the combustion grate inclined upwardly from the combustion grate toward said outlet, and means for supplying air preheated in the air cooled grate to the furnace chamber and the combustion chamber to obtain substantially complete combustion.

3. In an incinerator, a furnace chamber having a lateral enclosing wall, a combustion chamber, means including an outlet in said wall for directing gases from the furnace chamber upwardly into the top of the combustion chamber, a combustion grate at the lower part of said furnace chamber, an air cooled drying grate above the combustion grate, the arrangement being such that the cross-section of the passage between the grates increases toward the outlet, and means for supplying air preheated in the air cooled grate to the furnace chamber and the combustion chamber to obtain substantially complete combustion.

4. In an incinerator, a furnace chamber having at a side thereof an outlet for combustion gases, a grate at the lower part of said chamber, an air cooled drying grate including a plurality of tubes, an air supply manifold connected with said tubes, and a hot air manifold to receive air from said tubes, means for supplying air to said air supply manifold adjacent to the outlet side of said chamber and means for taking air from the hot air manifold at a point distant from said outlet and delivering the heated air to a plurality of spaced points beneath the lower grate.

5. In an incinerator, a furnace chamber, a combustion grate at the lower part of said chamber, a drying grate above said combustion grate, said drying grate including a series of tubes in U-shape longitudinal with their legs extending upwardly through the top of the chamber, an air supply manifold above the top of said chamber and connected with one end of each of said tubes, a hot air manifold, above the top of said chamber and connected with the other ends of said tubes, and means for supplying air preheated in said tubes to points in the vicinity of the combustion grate to assure an oxidizing atmosphere.

6. In an incinerator, a furnace chamber having an outlet at one side thereof, a combustion grate at the lower part of said chamber, a drying grate above said combustion grate, said drying grate including a series of tubes, an air supply manifold inside said chamber and connected with one end of each of said tubes and a hot air manifold in said chamber at a lower level than the supply manifold and connected with the other ends of said tubes, said air supply manifold extending across the chamber adjacent to the side having the outlet and the hot air manifold extending across the chamber at the opposite side thereof, and means for forcing air into the supply manifold and conducting air preheated in said drying grate and manifolds from the hot air manifold to points adjacent to the combustion grates to assure an oxidizing atmosphere above the same.

7. In an incinerator, a furnace chamber, a combustion grate in the lower part of said chamber, a drying grate above said combustion grate, said drying grate including a series of tubes in U-shape longitudinally with their legs extending upwardly through the top of the chamber, an air supply manifold above the top of said chamber and connected with one end of each of said tubes and a hot air manifold above the top of said chamber and connected with the other ends of said tubes, an outlet for said furnace, a combustion chamber into which said outlet discharges, and means for supplying air preheated in said tubes to points in the vicinity of the combustion grate and also to the combustion chamber.

8. In an incinerator, a furnace chamber having an outlet at the side thereof to discharge gases of combustion therefrom, a combustion grate in the lower part of said chamber, a drying grate above said combustion grate and including a series of tubes in U-shape longitudinally with their legs extending upwardly through the top of the chamber, an air supply manifold above the top of said chamber and connected with one end of each of said tubes and a hot air manifold above the top of said chamber and connected with the other ends of said tubes, the series of tubes in U-shape being arranged in succession from the side of said chamber opposite said outlet to the side containing said outlet and the bottoms of the successive U-shapes being spaced farther and farther from the combustion grate toward the outlet side of the chamber, and means for supplying air preheated in said tubes to points in the vicinity of said combustion grate.

9. In an incinerator, a furnace chamber having an outlet at the side thereof to discharge gases of combustion therefrom, a combustion chamber to receive the gases from said outlet, a combustion grate in the lower part of said furnace chamber, a drying grate above said combustion grate and including a series of tubes in U-shape longitudinally with their legs extending upwardly through the top of the chamber, an air supply manifold above the top of said chamber and connected with one end of each of said tubes and a hot air manifold above the top of said chamber and connected with the other ends of said tubes, the series of tubes in U-shape being arranged in succession from the side opposite said outlet to the side containing said outlet and the bottoms of the successive U-shapes being spaced farther from the combustion grate toward the outlet side of the chamber, and means for supplying air preheated in said tubes to points in the vicinity of said combustion grate and also to said combustion chamber.

10. In an incinerator, a furnace chamber, a combustion grate at the lower part of said chamber, an air cooled drying grate above said combustion grate and including a plurality of tubes, an air supply manifold connected with said tubes and a hot air manifold connected with said tubes to receive air therefrom, an outlet for said combustion chamber above the level of the combustion grate, a combustion chamber to receive gases of combustion from said outlet, a bridge wall across said combustion chamber to direct the combustion gases to the top of said chamber before entering the part of the chamber at the other side of the bridge wall, means for forcing air into said supply manifold, and means for directing air from the hot air manifold to the furnace chamber and to the portion of the combustion chamber into which the combustion gases are discharged from said outlet prior to passing over the bridge wall.

WILLIAM LINTON McEVER.